US012801969B2

(12) United States Patent
Tannu et al.

(10) Patent No.: US 12,801,969 B2
(45) Date of Patent: Nov. 17, 2026

(54) SYSTEMS, METHODS, AND DEVICES FOR QUANTUM COMPUTING ERROR MITIGATION

(71) Applicant: Georgia Tech Research Corporation, Atlanta, GA (US)

(72) Inventors: Swamit S. Tannu, Atlanta, GA (US); Moinuddin K. Qureshi, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 1270 days.

(21) Appl. No.: 17/753,317

(22) PCT Filed: Aug. 31, 2020

(86) PCT No.: PCT/US2020/048734
§ 371 (c)(1),
(2) Date: Feb. 28, 2022

(87) PCT Pub. No.: WO2021/042028
PCT Pub. Date: Mar. 4, 2021

(65) Prior Publication Data

US 2022/0300849 A1 Sep. 22, 2022

Related U.S. Application Data

(60) Provisional application No. 62/893,352, filed on Aug. 29, 2019, provisional application No. 62/893,471, filed on Aug. 29, 2019.

(51) Int. Cl.
*G06N 10/70* (2022.01)
*G06N 10/20* (2022.01)
*G06N 10/40* (2022.01)
*G06N 10/60* (2022.01)

(52) U.S. Cl.
CPC ............. *G06N 10/70* (2022.01); *G06N 10/20* (2022.01); *G06N 10/40* (2022.01); *G06N 10/60* (2022.01)

(58) Field of Classification Search
CPC ............................... G06N 10/60; G06N 10/70
See application file for complete search history.

(56) References Cited

U.S. PATENT DOCUMENTS 9,105,000 B1 8/2015 White et al.
2008/0140749 A1 6/2008 Amato et al.
2012/0042210 A1 2/2012 Glaser et al.
2013/0246495 A1 9/2013 Svore et al.
(Continued)

OTHER PUBLICATIONS

Tannu SS, Qureshi MK. A case for variability-aware policies for nisq-era quantum computers. arXiv preprint arXiv:1805.10224. May 25, 2018. (Year: 2018).*
(Continued)

*Primary Examiner* — Schyler S Sanks
(74) *Attorney, Agent, or Firm* — TROUTMAN PEPPER LOCKE LLP; Ryan A. Schneider; Korbin M. Blunck

(57) ABSTRACT

A quantum computing method including: receiving program instructions; executing the program instructions on a quantum machine for a plurality of trials to generate a plurality of results; combining the plurality of results of the execution for each of the plurality of trials; and determining a program result of the execution based on the combination of the plurality of results.

22 Claims, 10 Drawing Sheets

(56) References Cited

U.S. PATENT DOCUMENTS

| | | | |
|---|---|---|---|
| 2015/0032994 | A1 | 1/2015 | Chudak et al. |
| 2015/0081753 | A1 | 3/2015 | Iyer et al. |

OTHER PUBLICATIONS

International Search Report and Written Opinion from Application No. PCT/US2020/048734 dated Dec. 8, 2020.
Devitt, "Performing Quantum Computing Experiments in the Cloud," Physical Review Sep. 1, 2016.

* cited by examiner

SYSTEMS, METHODS, AND DEVICES FOR QUANTUM COMPUTING ERROR MITIGATION

CROSS REFERENCE TO RELATED APPLICATION

This application claims benefit under 35 U.S.C. § 119(e) of U.S. Provisional Patent Application Nos. 62/893,352, filed 29 Aug. 2019, entitled "Mitigating Measurement Errors in Quantum Computers by Exploiting State-Dependent Bias," 62/893,471, filed 29 Aug. 2019, entitled "Improving Fidelity of Quantum Computers by Orchestrating Dissimilar Mistakes," and which are incorporated herein by reference in their entireties as if set forth herein.

BACKGROUND

Quantum computers promise to solve hard problems, which are beyond the capabilities of conventional computers. Quantum computers use qubits to encode and process information. Qubits are extremely susceptible to noise and other errors, and cannot hold the state for more than several tens of microseconds. Thus, one of the biggest challenges in building a large scale quantum computer is vulnerability to errors. Qubit errors can be addressed by using quantum error correction codes. Unfortunately, quantum error correction requires about 20 to 50 physical qubits to build one fault-tolerant logical qubit, significantly increasing the size and complexity of a quantum computer. Therefore, many quantum computers are operated in what is called the Noisy Intermediate Scale Quantum (NISQ) model of computing.

In a NISQ computing model, an application performs computation, the output is measured, and this output gets logged. This process is repeated for a large number of trials. If the error-free output appears with a reasonable probability (i.e., if the correct answer output the majority or plurality of the time), then the output-log can be used to infer the correct answer. Therefore, one of the key performance metrics for a NISQ machine is the likelihood that the output produced is error-free. This metric is called the Probability of Successful Trial (PST). Techniques that can help in reducing the impact of errors on a NISQ machine leads to improvement in PST.

Qubit allocation and mapping policies deal with the problem of assigning a program qubits to the physical qubits (qubit assignment and/or mapping) and moving the qubit from source to destination for performing two-qubit operations (qubit routing). Qubit allocation policies have a significant impact on the reliability of NISQ machines as these policies can determine the number of operations required to execute a given program. Routing of the qubit from source to destination is typically accomplished by inserting additional SWAP instruction that can swap two neighboring qubits. Related art qubit mapping policies try to minimize the number of SWAP instructions. Additionally, related art approaches also investigated variation-aware qubit mapping policies try to determine the strongest collection of qubits and links (the ones with lowest error rates) to perform the computation. These related art approaches on intelligent qubit mapping (both SWAP minimizing and variation-aware) try to determine or estimate the best mapping and use that mapping for running all of the trials on the NISQ machine.

However, such related art approaches leave the application vulnerable to significant errors. For example, utilizing a single best qubit assignment and routing leaves the application vulnerable to correlated errors. For example, if an estimated best set of qubits and links is particularly susceptible to a particular error, such an error would be repeatable during the computation for all of the trials performed on the same set of qubits and links. Therefore, the same erroneous output could occur for a large number of trials. Additionally, selecting a "best" set of qubits and links is typically limited to an estimate. Thus, a set of mappings and routings selected to run all trials may not be as accurate as predicted.

Therefore, to address these problems with certain techniques, devices, and systems for mitigating errors in quantum computing are proposed, improving the operation of quantum machines.

SUMMARY

Briefly described, and according to some embodiments, aspects of the present disclosure generally relate to a quantum computing method including: receiving program instructions; executing the program instructions on a quantum machine for a plurality of trials to generate a plurality of results; combining the plurality of results of the execution for each of the plurality of trials; and determining a program result of the execution based on the combination of the plurality of results.

The method can further include: identifying a plurality of quantum configurations of the quantum machine for executing the program; executing respective subsets of the plurality of trials on each of the plurality of identified quantum configurations; and merging results of the plurality of trials to determine the program result of the execution.

The method can further include: translating the program instructions into a plurality of operation sets, each of the plurality of operation sets being able to fully execute the program instructions; executing respective subsets of the plurality of trials in accordance with each of the plurality of operation sets; and merging results of the plurality of trials to determine the program result of the execution.

The method can further include: transforming a state of a subset of the plurality of results creating a plurality of transformed results and a plurality of untransformed results; measuring the plurality of transformed results creating a plurality of transformed measurements; rectifying the plurality of transformed measurements to compensate for the transforming creating a plurality of rectified measurements; measuring the plurality of untransformed results creating a plurality of untransformed measurements; combining the rectified measurements and the untransformed measurements; and determining the program result of the execution based on the combination of measurements.

The method can further include: distributing the plurality of results into a plurality of subsets; respectively transforming a state of the results for each subset of the plurality of results creating respective pluralities of transformed results; measuring the respective pluralities of transformed results creating a respective plurality of transformed measurements; rectifying the respective pluralities of transformed measurements to compensate for the transforming creating respective pluralities of rectified measurements; combining the respective pluralities of rectified measurements; and determining the program result of the execution based on the combination of the pluralities of rectified measurements.

According to aspects of the present disclosure, there may be provided a quantum machine configured to implement a method including: receiving program instructions; executing the program instructions on the quantum machine for a plurality of diverse trials to generate a plurality of results; combining the plurality of results of the execution for each of the plurality of trials; and determining a program result of the execution based on the combination of the plurality of results.

According to aspects of the present disclosure, there may be provided a non-transitory computer readable medium having stored thereon instructions for a quantum machine to execute a method including: receiving program instructions; executing the program instructions on the quantum machine for a plurality of diverse trials to generate a plurality of results; combining the plurality of results of the execution for each of the plurality of trials; and determining a program result of the execution based on the combination of the plurality of results.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
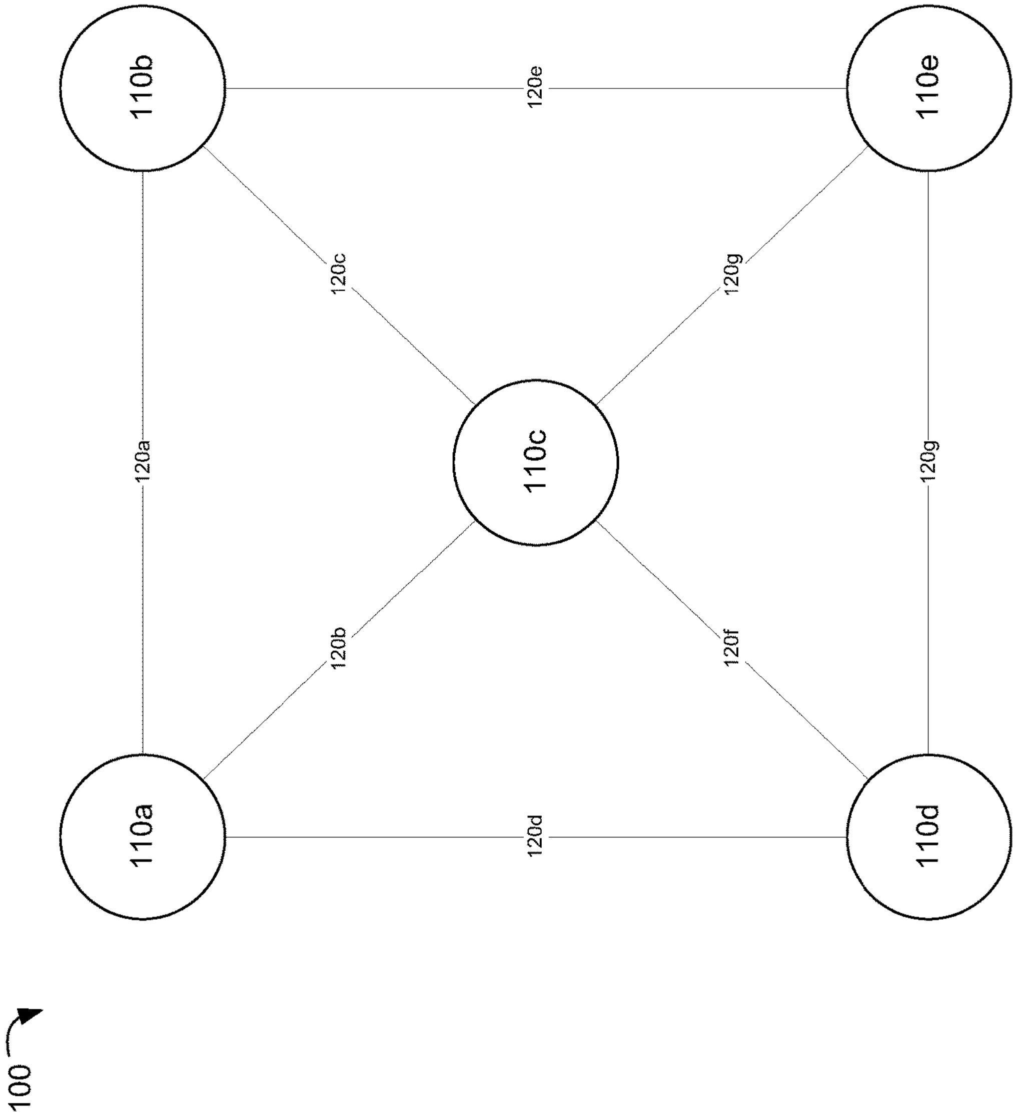
FIG. 1 illustrates a NISQ architecture in accordance with aspects of the present disclosure.
Figure 2A:
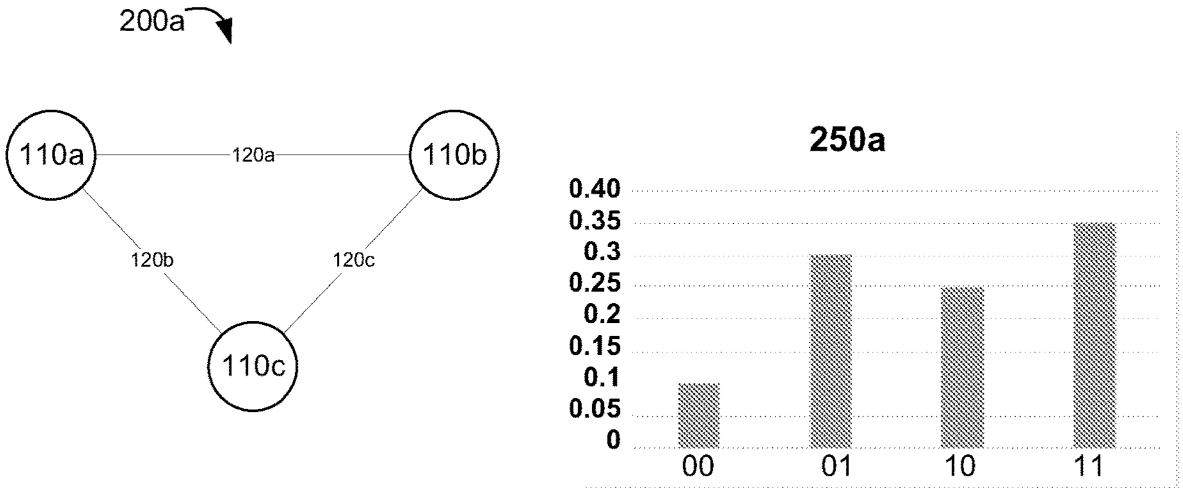
FIGS. 2A-2D illustrate different mappings and routings of three interlinked qubits and related probability distributions.
Figure 2B:
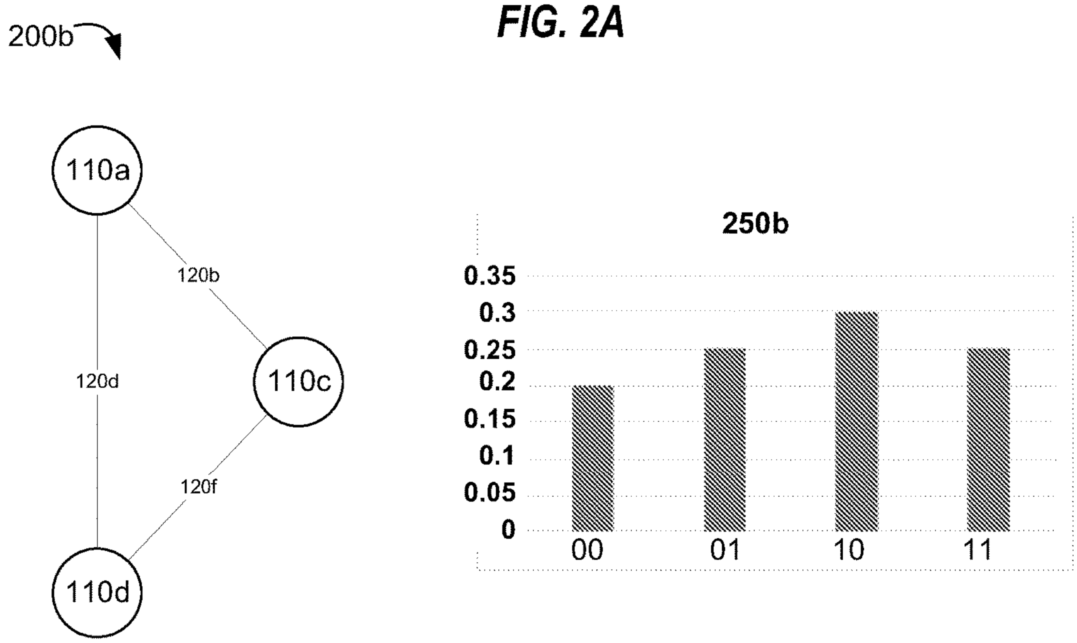
Figure 2C:
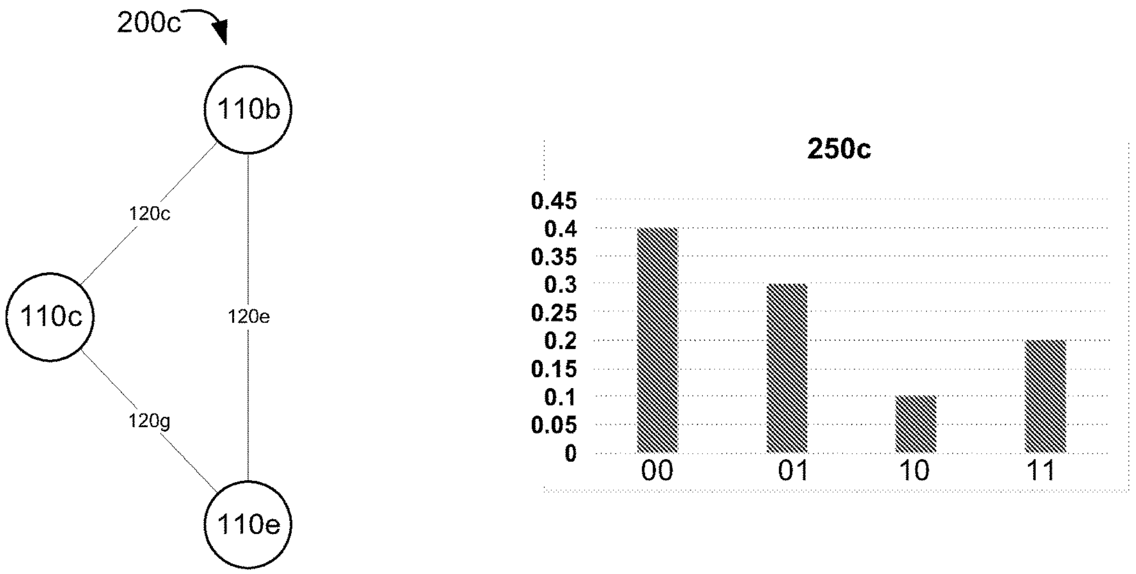
Figure 2D:
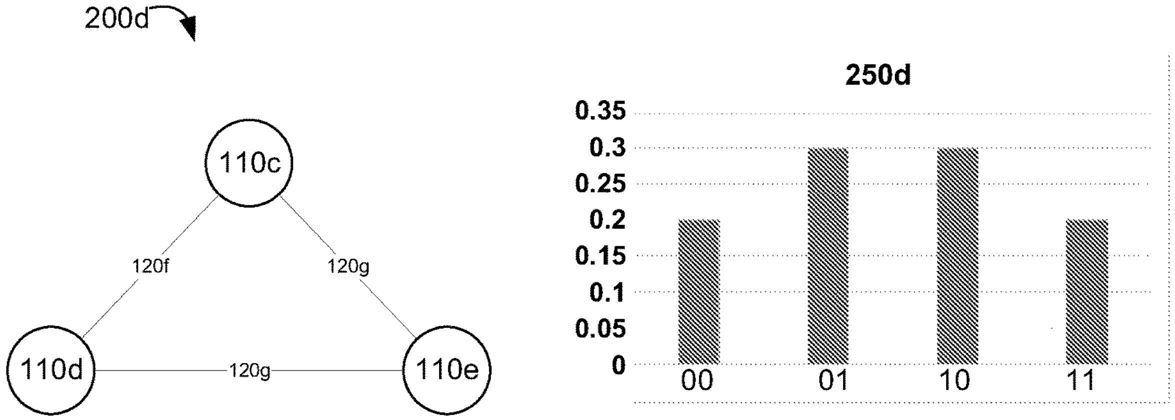

As discussed above, the related art attempts to address the limitations of NISQ computing by executing a process repeatedly on a single "best" mapping and routing of qubits. Mapping and routing together may be referred to herein as qubit configuration or configuration. However, this approach relies on imperfect selection and ignores certain types of errors. Certain embodiments of the disclosed technology provide systems, methods, and devices for quantum computing error mitigation. In some cases, diversification is used to improve the accuracy of a NISQ machine. By utilizing diversity, correlated errors (i.e., errors endemic to a particular mapping, routing, program, and/or state) may be neutralized. According to aspects of the present disclosure, a plurality of mappings and/or routings of qubits could be used to run subsets of total trials. Additionally or alternatively, diversity could be achieved by executing trials on different quantum computing devices (i.e., completely separate devices instead of separate portions of a same quantum computer). Additionally or alternatively, a plurality of machine-level interpretations of a same program could be used (e.g., diversified programming) to run various trials. Additionally or alternatively, programmatic variation could be used to run various trials or operations. Additionally or alternatively, state variation of the qubits could be used to run various trials or operations. In some cases, transformation of the qubit state could be used to move to a more reliable state without the use of diversity.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. It is to be understood, however, that embodiments of the disclosed technology may be practiced without these specific details. In other instances, well-known methods, structures and techniques have not been shown in detail in order not to obscure an understanding of this description. References to "one embodiment," "some embodiments," "an embodiment," "example embodiment," "various embodiment," etc., indicate that the embodiment (s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example embodiments of the disclosed technology will now be described with reference to the accompanying figures.

FIG. 1 illustrates an example NISQ architecture 100 with five (5) qubits 110*a*, 110*b*, 110*c*, 110*d*, and 110*e*, and eight (8) links 120*a*, 120*b*, 120*c*, 120*d*, 120*e*, 120*f*, 120*g*, and 120*h*. FIGS. 2A-2D illustrate different mappings and routings 200*a*, 200*b*, 200*c*, and 200*d* of three interlinked qubits and related probability distributions 250*a*, 250*b*, 250*c*, and 250*d* for four possible outcomes (00, 01, 10, and 11, with 01 being the correct answer). As shown in FIGS. 2A-2D and below in Table 1, none of the mappings will reliably select the correct answer (01). However, in the related are approach, mapping 200*d* (the "best" mapping) would be selected for all trials, and the correct answer (01) and one incorrect answer (10) could be selected with equal probability.

Meanwhile, utilizing aspects of the present disclosure, each of four mappings 200*a*, 200*b*, 200*c*, and 200*d* may be used for different trials, and the results can be combined. This combination of results can neutralize the correlated errors of each individual mapping so that the correct answer (01) is more readily identified. Table 1, below repeats the probability for mappings 200*a*, 200*b*, 200*c*, and 200*d*, and illustrates that a non-weighted, even distribution of diverse mappings raises the correct result (01) about all other options:

TABLE 1

| Mapping | Qubits | Probabilities 00 | 01 | 10 | 11 |
|---|---|---|---|---|---|
| 200a | 110a, 110b, 110c | .1 | .3 | .25 | .35 |
| 200b | 110a, 110c, 110d | .2 | .25 | .3 | .25 |
| 200c | 110b, 110c, 110e | .4 | .3 | .1 | .2 |
| 200d | 110c, 110d, 110e | .2 | .3 | .3 | .2 |
| Evenly Distributed | N/A | .225 | .2875 | .2375 | .25 |

An additional benefit of diversity of mapping (e.g., an ensemble of diverse mappings) is that the longevity of the qubits (and the quantum machine generally) can potentially be increased. For example, overuse of a single mapping and/or routing can create excess wear on particular qubits or links. Thus, by utilizing diversity of mapping, the potential wear can be distributed, and the longevity of a quantum machine can be increased. Additionally, by utilizing diversification, the overall reliability (PST) increases. Therefore, as compared to the related art, fewer total trials are needed to achieve a statistically meaningful results histogram that can be used to determine a correct answer. Further, by utilizing different configurations, trials can be performed in greater parallelization, which can increase overall speed of the quantum machine. For example, in a case where multiple quantum computers are provided, parallelism can be provided by simultaneously running the input program on all available N machines, and combining the output.

Although Table 1 and FIGS. 1 and 2A-2D illustrate different mappings on a single quantum computer, this is merely an example. In some cases, similar or stronger diversity may be achieved by executing trials on a plurality of quantum computing devices in addition or instead of executing the trials on a plurality of mappings on a same device. By utilizing different devices, the risk of correlated errors are further decreased.

Further, although Table 1 illustrates a non-weighted, even distribution, this is merely an example. In some cases, the distribution of mapping selections could be uneven. For example, Table 2 below illustrates uneven distribution based on predicted "best" mappings. For the purposes of illustration, the "best" mapping (200*d*) is run for 35% of trials, the next "best" mapping (200*a*) is run for 30% of trial, the next "bets" mapping (200*b*) is run for 20% of trials, and the worse mapping (200*c*) is run for 15% of trials.

TABLE 2

| Mapping | Qubits | Trial Percentage | Probabilities 00 | 01 | 10 | 11 |
|---|---|---|---|---|---|---|
| 200a | 110a, 110b, 110c | 30% | .1 | .3 | .25 | .35 |
| 200b | 110a, 110c, 110d | 20% | .2 | .25 | .3 | .25 |
| 200c | 110b, 110c, 110e | 15% | .4 | .3 | .1 | .2 |
| 200d | 110c, 110d, 110e | 35% | .2 | .3 | .3 | .2 |
| Unevenly Distributed | N/A | | 0.2 | 0.29 | 0.255 | 0.255 |

Additionally or alternatively to uneven distribution, trial results may be combined in a weighted manner. As non-limiting examples, the weights could be based on one or more from among mapping quality (e.g., "best" mapping or predicted best mapping), non-uniformity, entropy of distribution, and fitness of solution. Mapping quality can be similar to that described above with regards to unevenness (e.g., the trial results of a mapping which is expected to be a best fit are weighted greater than mappings which are expected to be worse fits). Non-uniformity or non-uniformity of data relates to the results on a mapping being more different from the remaining mappings. In other words, outliers may be given greater weight when compared to mappings that more closely fit the remaining trials. In some cases, the histogram of results may be of a plurality of mappings may be compared and the results weighted based on a scale of divergence.

Entropy of distribution relates to the tightness of fitness. Maximal entropy of distribution would be a same result for all trials of a particular mapping. As entropy of distribution decreases, the number and spread of results for different trials increases. Thus, the results for mappings with highest entropy may be weighted higher than mappings with lower entropy of distribution. Fitness of solution relates to known accuracy (or inaccuracy) of results. For example, if certain problems cannot have certain results (e.g., a negative number for absolute temperature), the mappings that result in more impossible results may be weighted less than mappings with more possible results.

Additionally or alternatively, configurations, weights, and/or unevenness may be adjustable. For example, in some cases, a first set of trials may be executed evenly across a selected plurality of configurations. Based on preliminary results of these trials, different configurations or unevenness of trial runs may be performed on the remaining trials or a next set of trials. Additionally or alternatively, continuous or periodic analysis of preliminary results of trials may be used to continuously or periodically adjust the selected configurations and/or unevenness of distribution of future trials.

Figure 7:
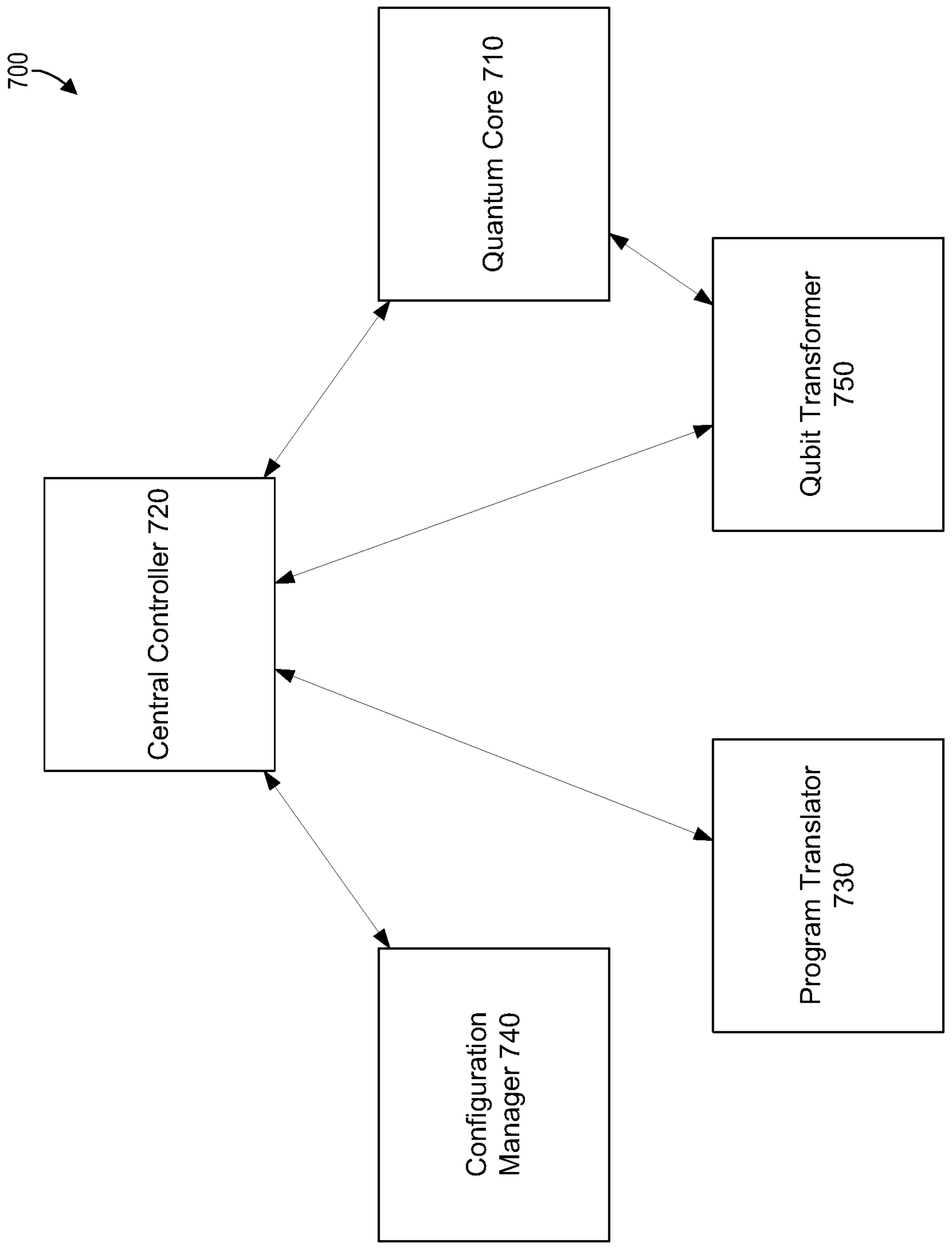
FIGS. 7 and 8 are block diagrams of a quantum machine according to aspects of the present disclosure

FIG. 7 is an example block diagram of a quantum machine 700 according to aspects of the present disclosure. The quantum machine 700 includes one or more quantum cores 710, central controllers 720, program translators 730, configuration managers 740, and qubit transformers 750. The quantum core includes the qubits (e.g., qubits 110*a*-110*e*) for executed programs. The central controller 720 controls the quantum core, for example, configuring the qubits and selecting which qubits are used to execute various portions of the program. Program translator 730 can receive a program (e.g., assembly-level code) and translates late the code for execution by the quantum cores 710. Configuration manager 740 may determine a configuration (e.g., mapping and routing) to be used for particular programs and/or program translations. Qubit transformer 750 may alter a state of a qubit (e.g., invert the value of the qubit).

Figure 8:
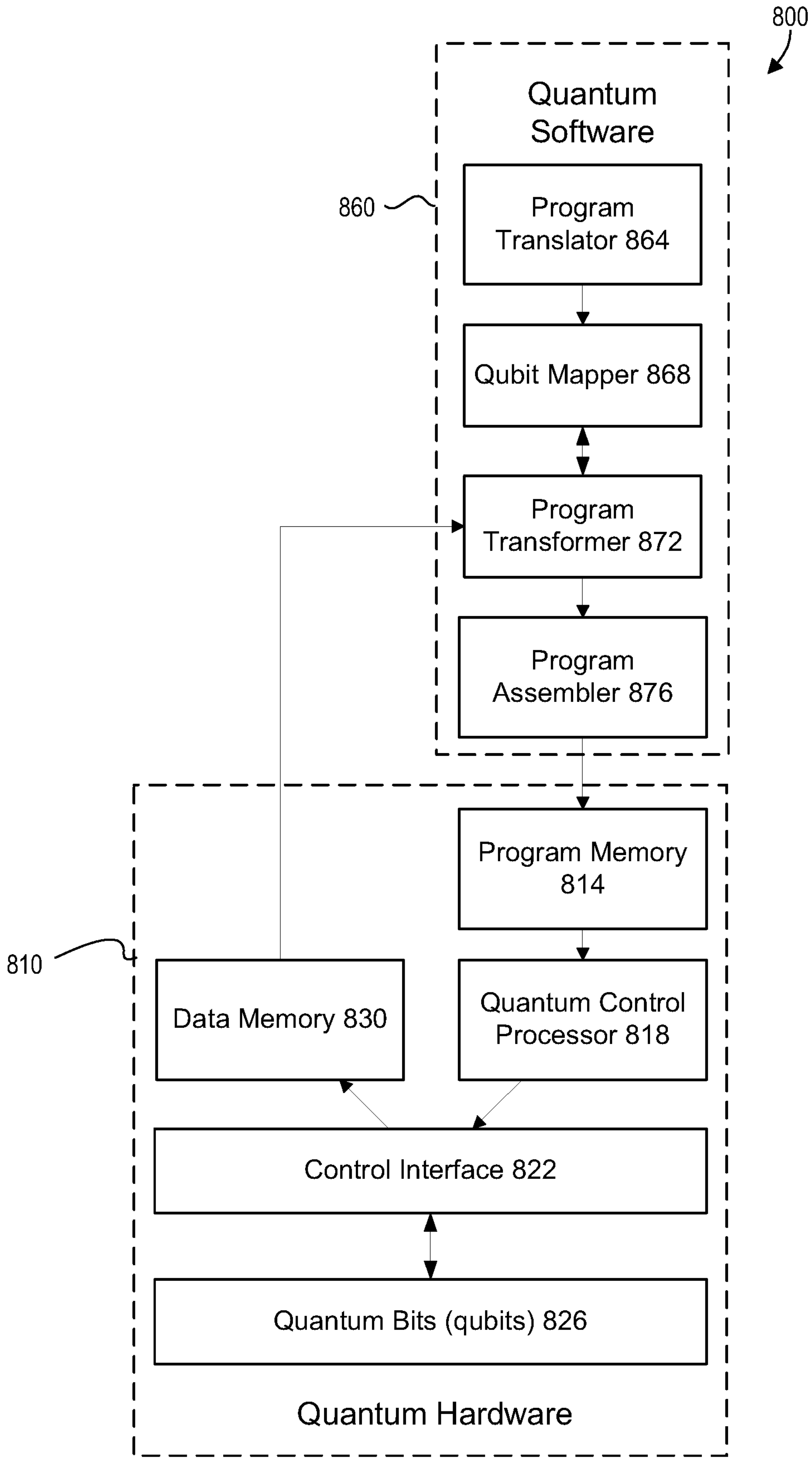

FIG. 8 is an example block diagram of a quantum machine 800 according to aspects of the present disclosure. Quantum machine 800 includes quantum hardware 810 and quantum software 860. The quantum hardware 810 includes program memory 814, quantum control processor 818, control interface 822, qubits 826, and data memory 830. The program memory stores program instructions for execution on the quantum hardware. The quantum control processor 818 retrieves the program memory and determines configuration information for the qubits based on information from the qubit mapper 868. The control interface 822 provides an interface between the qubits 826 and the quantum control processor 818 and data memory 830. The control interface can interact with the qubits 826 to provide instructions from quantum control processor 818 and to measure the qubits 826 for storage in data memory 830. The data memory 830 stores the results from the qubits 826 trials, which can then be analyzed to determine a correct result for the program.

Quantum software 860 includes a program translator 864, a qubit mapper 868, a program transformer 872, and a program assembler 876. Program translator 864 can translate the program from a higher-level language to a lower-level language closer to the language that can be implemented directly on quantum hardware 810. Qubit mapper 868 can set configurations (e.g., mapping and links) for executing a translated program. Program transformer 872 can modify the program to provide diversity of operations, for example, as discussed below with reference to FIG. 4. Program assembler 876 organizes the program including, for example, number of trials, and trial evenness between diverse executions. Quantum software 860 may be implemented on various hardware components.

Aspects of these components described with reference to FIGS. 7 and 8 can be implemented using one or more traditional or novel architectures, for example, as described below with reference to FIG. 9. One of ordinary skill will recognize that not all elements depicted in FIGS. 7 and 8 would be necessary to implement all aspects of the present disclosure. In some cases, additional and/or alternative systems could be used to replace or augment depicted portions of quantum machines 700 and 800.

Figure 3:
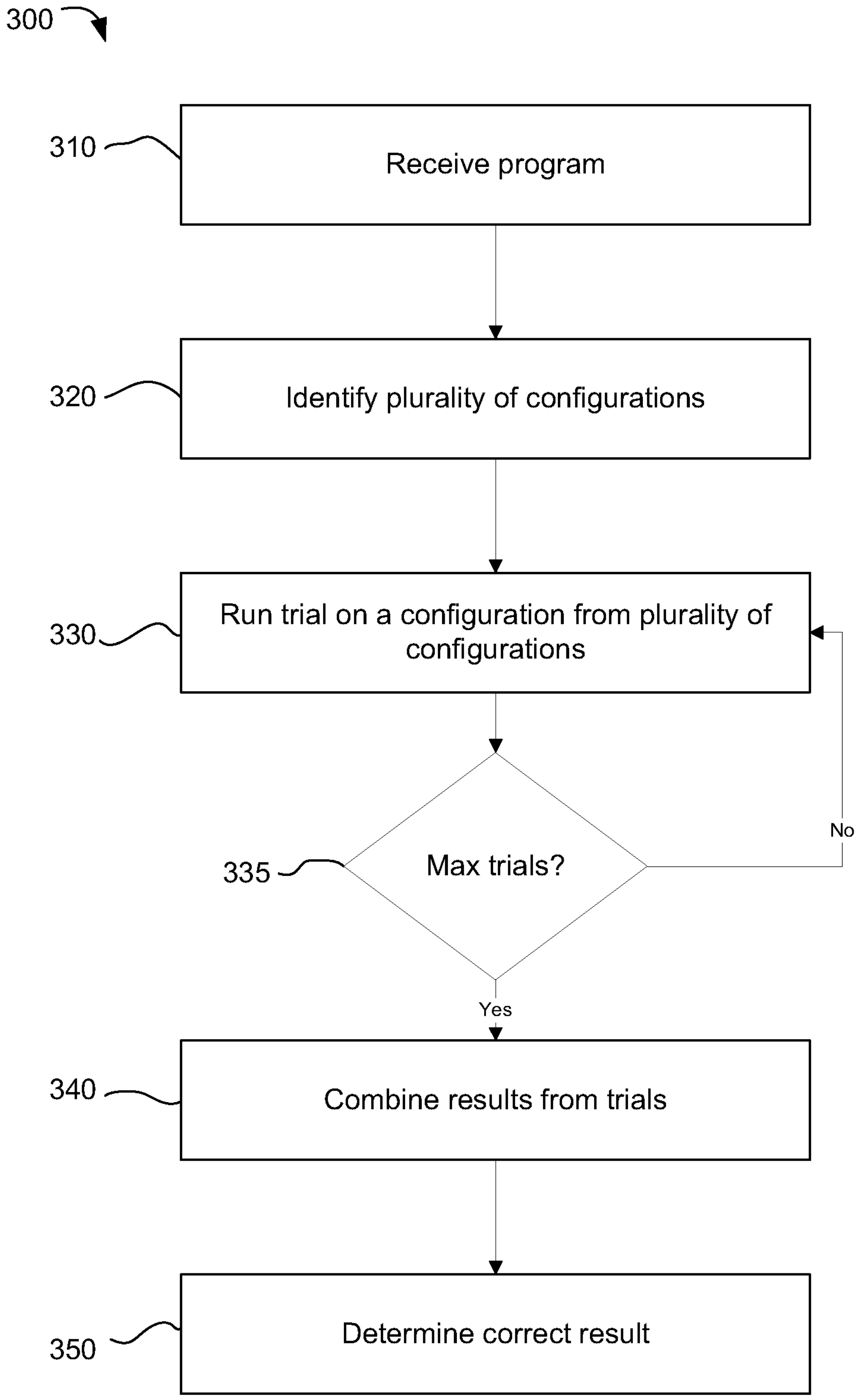
FIG. 3 is a flowchart illustrating a method of diversity of mapping according to aspects of the present disclosure.

FIG. 3 is a flowchart 300 illustrating a method of diversity of mapping according to aspects of the present disclosure. The method may be performed by a quantum machine (e.g., quantum machine 700), for example, utilizing an architecture similar to that described with reference to FIGS. 7 and 8. Referring to FIG. 3, a quantum machine receives 310 a program. The program may be a set of instructions that the quantum machine is supposed to execute. If necessary, program translator 730 can translate the program for execution by the quantum core. At 320 the quantum machine (e.g., configuration manager 740) identifies a plurality of qubit mappings and/or routings (e.g., configurations) to execute the program. As discussed, the configurations may be determined initially, determined after a first set of trials and an analysis of preliminary results, and/or determinized periodically and/or continuously based on, for example, current result tallies.

The quantum machine then runs 330 a plurality of trials for the programs divided between the plurality of configurations. For example, quantum core 710 may execute the program based on instructions from central controller 720. As discussed, the number of trials run for each can be evenly distributed or distributed by unevenly based on one or more determinations. Additionally, the trial distribution may be adjusted periodically or continuously between a plurality of configurations based on running tallies of results. If more trials are to be run (335—No), the quantum machine runs 330 a next trial.

Finally, the quantum machine (e.g., central controller) combines 340 the results from the trials to determine 350 correct program result. The quantum machine can average or straightly combine 340 the results from the trials to determine 350 a correct program result. However, this is merely an example. In some cases, the quantum machine may weigh the results or eliminate certain results prior to combining.

Additionally or alternatively, diversity of operations can be used. As will be understood, a machine has a certain set of basic operations that it can perform (e.g., addition and multiplication). Given a program, a compiler translates a program into a collection of basic operations. In the traditional approach, a program is translated into a single, predicted most efficient translation (i.e., collection of basic operations). However, alternative collection of basic operations can perform the same function. Trials can be executed using different collections of operations to diffuse particular errors associated with specific operations. Additionally or alternatively, diversity of operations can be implemented using algorithmic diversity. As would be understood by one of ordinary skill, certain operations can be performed using different algorithms. For example, numerous sorting algorithms are known in traditional computing, such as quick sort, bubble sort, and merge sort. Algorithmic diversity can include replacing an algorithm with a results-equivalent alternative algorithm. The replacement of algorithms would result in diversity of operations.

Figure 4:
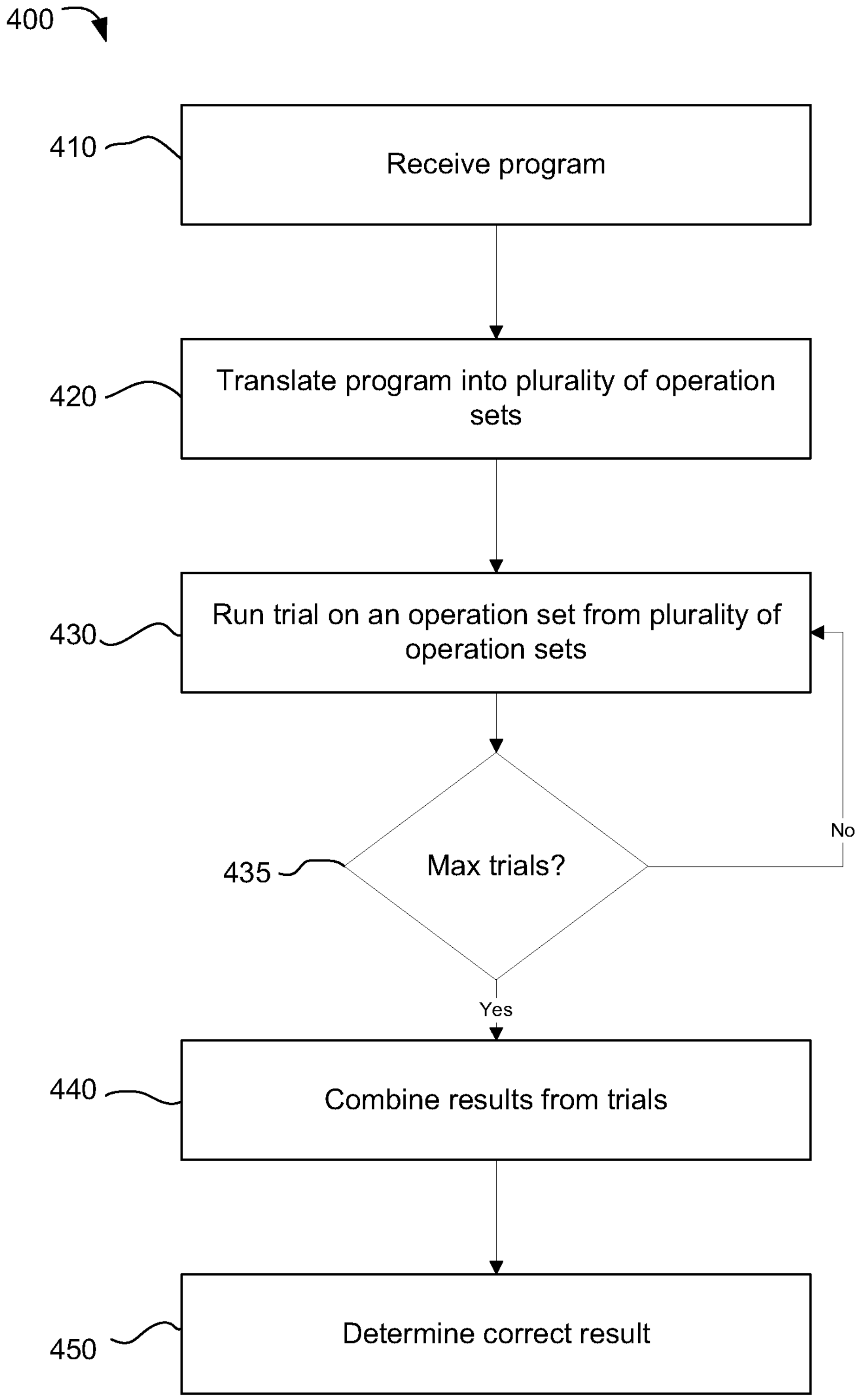
FIG. 4 is a flowchart illustrating a method of diversity of operations according to aspects of the present disclosure.

FIG. 4 is a flowchart 400 illustrating a method of diversity of operations according to aspects of the present disclosure. The method may be performed by a quantum machine (e.g., quantum machine 700), for example, utilizing an architecture similar to that described with reference to FIGS. 7 and 8. Referring to FIG. 4, a quantum machine 700 receives 410 a program. The quantum machine 700 (e.g., program translator 730) translates 420 the program into multiple sets of instructions that can each fully process the program. For example, in a traditional architecture, a multiplication of two numbers can also be performed by repeated additions. Similarly, certain functions in quantum computing can be executed using multiple different sets of operations or operation paths.

The quantum machine then runs 430 a plurality of trials for the programs divided between the plurality of operation sets. As discussed, the number of trials run for each can be evenly distributed or distributed by unevenly based on one or more determinations (e.g., expected accuracy). Additionally, the trial distribution may be adjusted periodically or continuously between operation sets based on running tallies of results. If more trials are to be run (435—No), the quantum machine runs 430 a next trial.

Finally, the quantum machine (e.g., central controller) combines 440 the results from the trials to determine 450 correct program result. The quantum machine can average or straightly combine 440 the results from the trials to determine 450 a correct program result. However, this is merely an example. In some cases, the quantum machine may weigh the results or eliminate certain results prior to combining.

Additionally or alternatively, diversity of qubit state may be used. For example, as will be understood by one of ordinary skill, measuring a qubit is fundamentally challenging as qubits are extremely low energy and, during a process of measurement, qubits are exposed to noisy measurement circuitry. Thus, even if a quantum machine performs all the computation without encountering an error, errors in the measurement can still result in an erroneous output. However, the error rate of measurement is different for different states of a qubit and collection of qubits. For ease of explanation, a measurement of classical binary states (0 or 1) is generally described herein, but this is merely an example and, in light of the present disclosure, one of ordinary skill would recognize that qubits can have various states.

In classical binary states, a measurement error occurs as either a "1" being read as a "0" or vice versa. The inventors found that, generally, the state "1" is erroneously read "0" with greater frequency than the state "0" being measured as the state "1." Therefore measurement can be improved by transforming (e.g., inverting) a "1" heavy state to a "0" heavy state. For example, if a state of five qubits is all 1's, measurement can be improved by inverting the qubits to all 0's, measuring the inverted state, and then inverting the result after-measurement. Similarly, measurement can generally be improved by inverting any collection of qubits with a majority of 1's.

As will be understood by one of ordinary skill, a result of measurements would not generally be known before-hand. Therefore, the system can transform the qubits based on expected results (e.g., if the result is expected to by "1" heavy, the state is inverted). However, this is merely an example. In some cases, the system may transform (e.g., invert) qubits in some trials in order to diversify errors. Additionally, while a single transformation (inversion of an entire qubit collection) has been discussed, this is merely an example. In some cases, transformation into multiple states could be possible, and the qubits could be transformed into different states for different trials.

Additionally or alternatively, transformations could be performed intelligently based on running results of trials (e.g., partial trial sets). For example, if a program is to be run for 10,000 trials, the results of the first 500 trials can be measured normally and the results of the second 500 trials can be inverted before measurement. The results of these first 1,000 trials can be combined and, based on these results, a "best" measurement state (e.g., whether to measure the results or the inverted results) or can be determined for the 9,000 remaining trials. Additionally or alternatively, the decision to invert could be made on a qubit-by-qubit basis. For example, if a five-qubit result is most likely 10101, in future trials, only the first, third, and fifth qubit can be inverted before the measurement operation.

As would be understood by one of ordinary skill, between trials, qubits generally have to be reset to 0, a process that can take additional time. Therefore, an additional benefit of transforming to a "0" heavy state is that the reset time between trials can be reduced, which can increase the speed of operation of the quantum machine.

Additionally or alternatively, profile information of particular machines or mappings could be used to determine state transformation decisions. The profile information can include validity outcome of measurement for all possible states (e.g., 00000, 00001, . . . , 11110, 11111 for classical 5-qubit states). Additionally or alternatively, weak states (e.g., states that are less reliable measurements) could be more greatly weighted than more common states in order to improve overall measurement fidelity.

Figure 5:
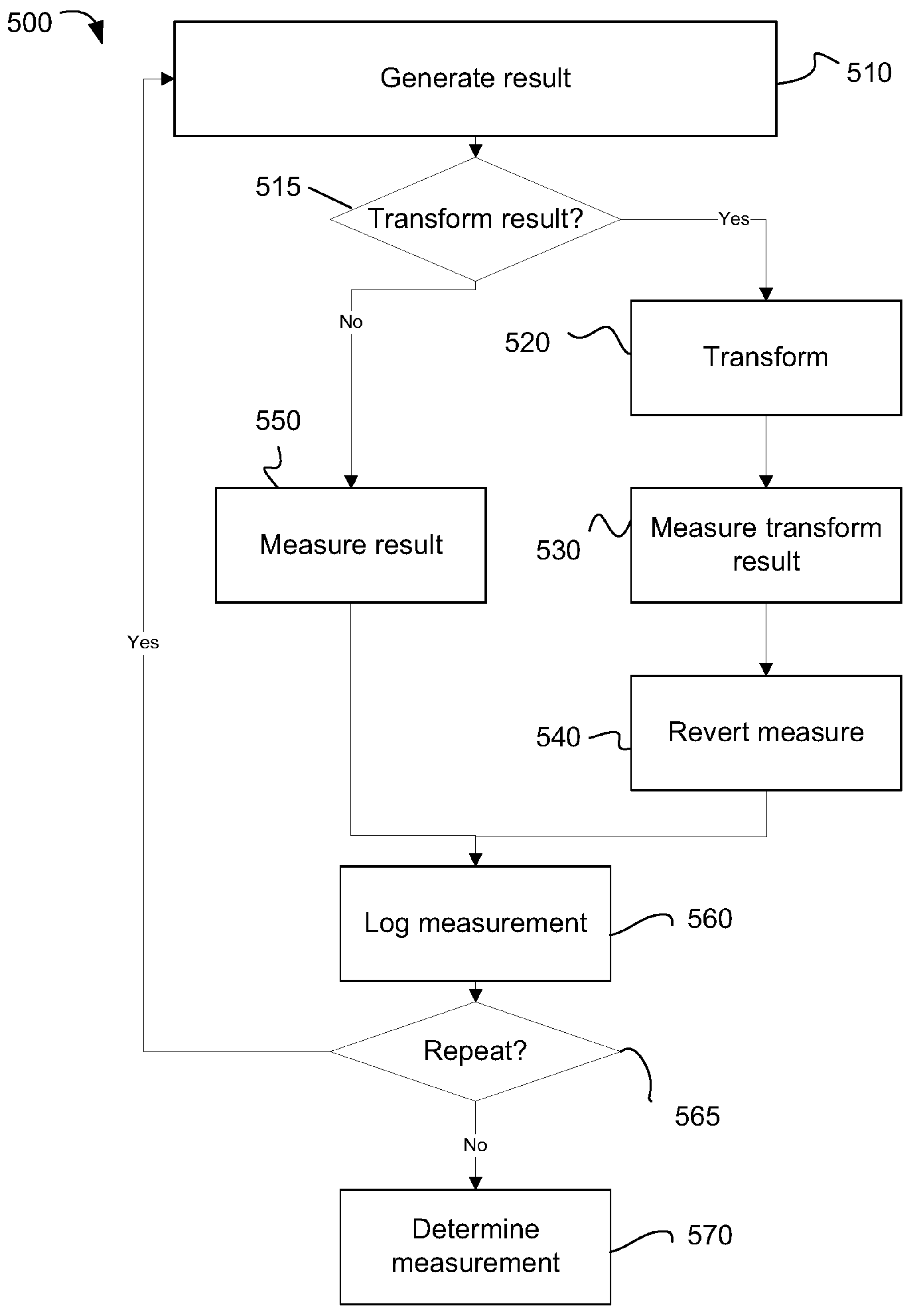
FIG. 5 is a flowchart illustrating a method of diversity of measurement according to aspects of the present disclosure.

FIG. 5 is a flowchart 500 illustrating a method of diversity of measurement according to aspects of the present disclosure. The method may be performed by a quantum machine (e.g., quantum machine 700), for example, utilizing an architecture similar to that described with reference to FIGS. 7 and 8. Referring to FIG. 5, a quantum machine 700 generates (or receives) 510 a result. The result can be stored in the quantum core 710 of the quantum machine 700. The quantum machine 700 (e.g., central processor 720) determines 515 whether the result should be transformed. For example, as discussed above, the transformation of the result (e.g., inversion) can result in more accurate measurement due to the state-dependent reliability of certain quantum systems. If no transformation is desired (515—No), the result is measured 550 and logged 560.

If transformation is desired (515—Yes), qubit transformer 750 transforms 520 the qubits. Example transformations include, as non-limiting examples, inversion, fixed XOR combinations, and the like. In some cases, inversion decisions can be made on a qubit-level (e.g., for each result, qubit transformer 750 can determine which if any of the individual qubits to transform). The quantum machine then measures 530 the transformed result and reverts 540 this measurement back the original form. For example, if the result was inverted, before being measured, the measurement can then be inverted again. The reverted measurement is also logged 560.

If more results are to be measured (565—Yes), the quantum machine generates or retrieves 510 a next result. However, if no additional results are required (565—No), the logs are analyzed to determine 570 a correct measurement.

As would be understood by one of ordinary skill in light of the present disclosure, the decision whether and how to transform a result may be determined a priori (e.g., inverting half of all results), continuously or repeatedly (e.g., based on a running best guess of the correct measurement), or based on a result of initial trials.

Additionally, while measurement and inversion are generally discussed, these are merely examples. One of ordinary skill in light of the present disclosure will recognize that aspects of the state transformation can be applied to different operations and to different state transformations.

Figure 6:
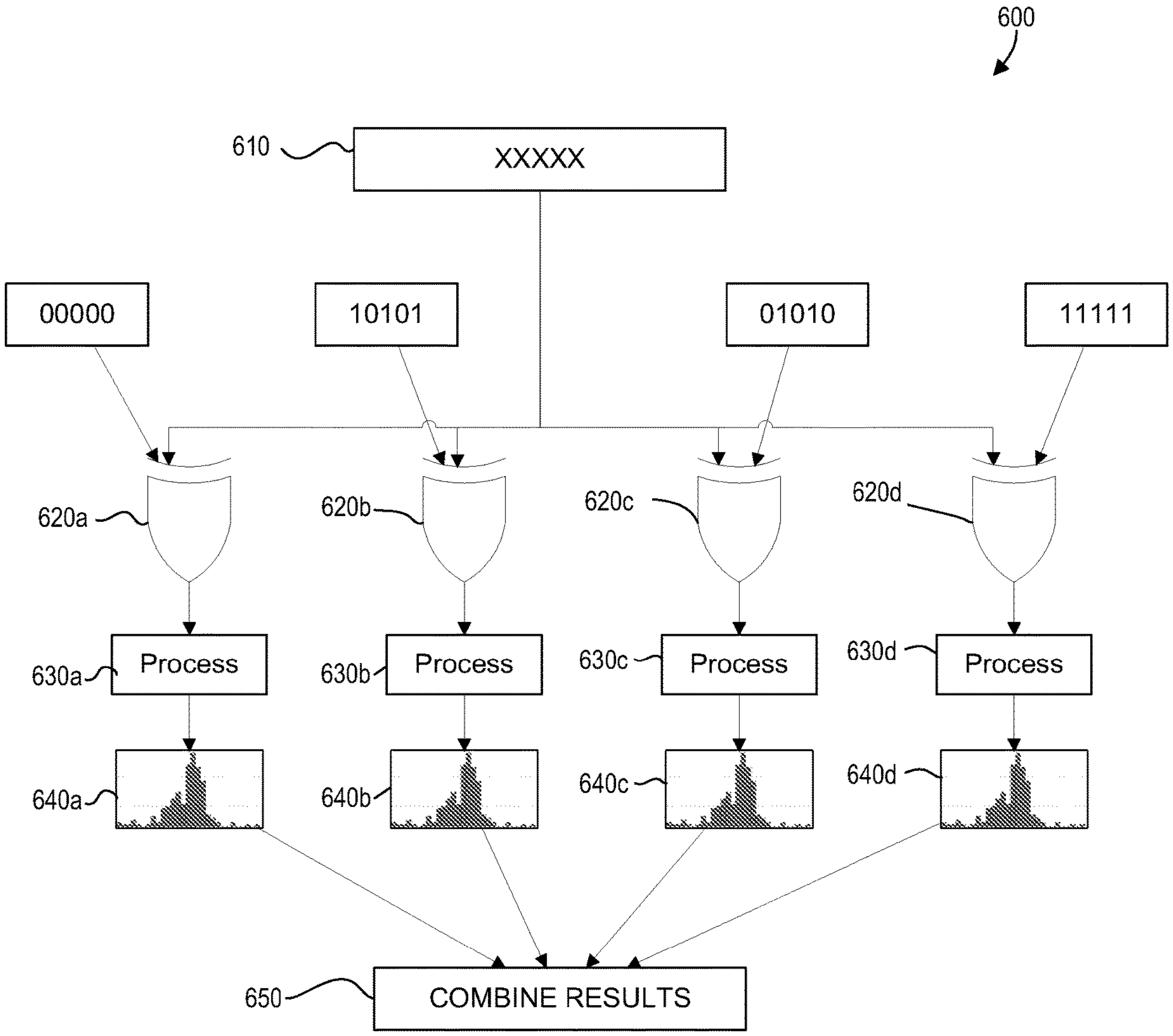
FIG. 6 is a diagram of a system for fixed transformation utilizing four different exclusive-ors (XOR) gates.

FIG. 6 is a diagram 600 of a system for fixed transformation of five qubits utilizing four different exclusive-ors (XOR) gates. One of ordinary skill will recognize that this is merely an example, and various alternative transformations, including bit-based transformation), could be conducted on qubits. Referring to FIG. 6, an input 610 is fed into 4 XOR gates 620*a*-620*d*. Each XOR gate 620*a*-620*d* utilizes a different static input (e.g., 00000 for 620*a*, 10101 for 620*b*, 01010 for 620*c*, and 1111 for 620*d*). The results from each XOR gate 620*a*-620*d* are processed 630*a*-630*d* (e.g., measured) and results 640*a*-740*b* are generated. The results 640*a*-640*d* are then combined at 650.

Figure 9:
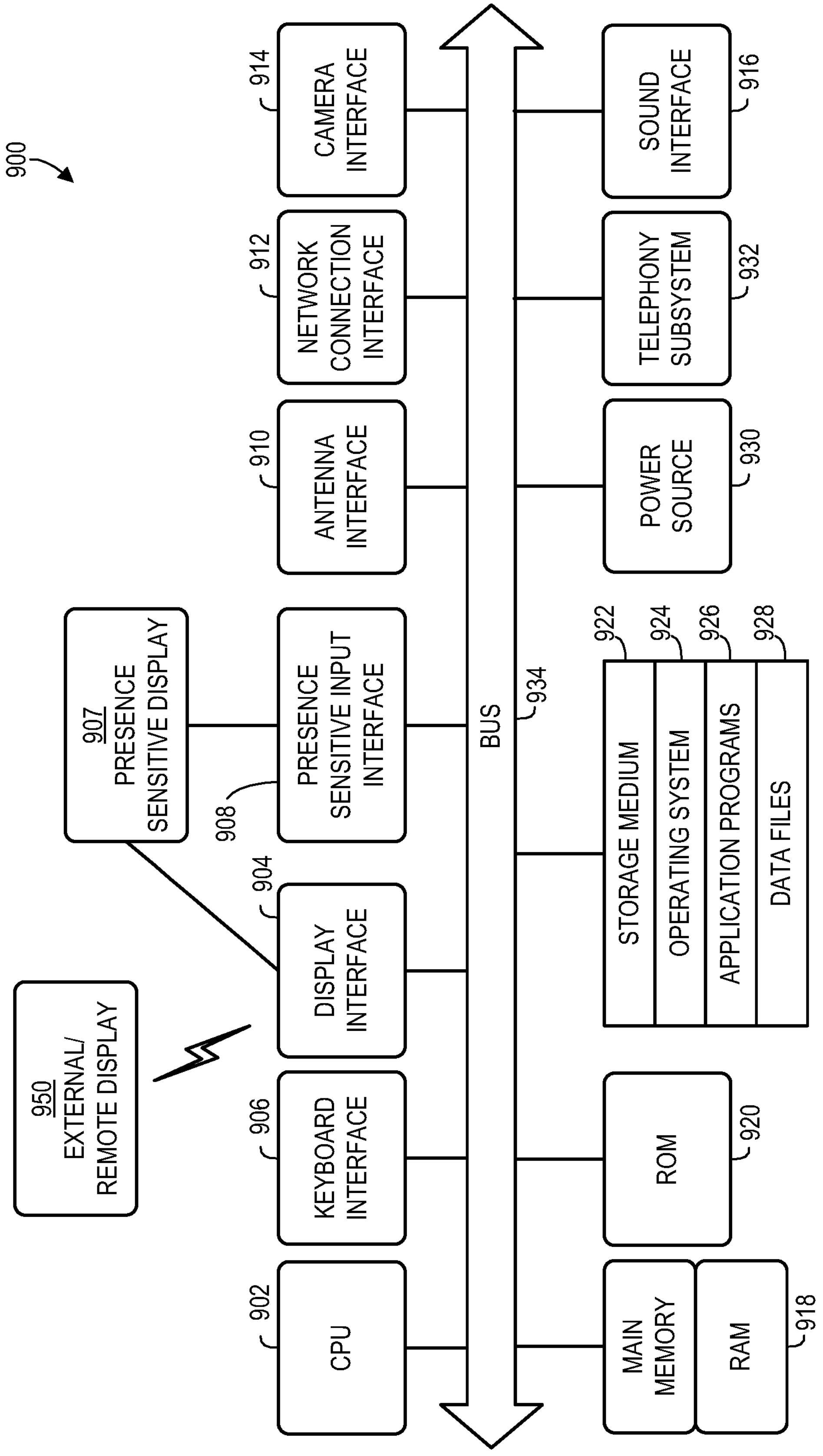
FIG. 9 is a block diagram of an illustrative computer system architecture.

FIG. 9 is an example computer architecture 900 that can be used to implement certain aspects of the present disclosure, such as a program translator or a configuration. However, this is merely an example, and various traditional and novel computer architectures could be used to implement aspects of the present disclosure.

The computing device architecture 900 of FIG. 9 includes a central processing unit (CPU) 902, where computer instructions are processed, and a display interface 904 that acts as a communication interface and provides functions for rendering video, graphics, images, and texts on the display. In certain example implementations of the disclosed technology, the display interface 904 may be directly connected to a local display, such as a touch-screen display associated with a mobile computing device. In another example implementation, the display interface 904 may be configured for providing data, images, and other information for an external/remote display 950 that is not necessarily physically connected to the mobile computing device. For example, a desktop monitor may be used for mirroring graphics and other information that is presented on a mobile computing device. In certain example implementations, the display interface 904 may wirelessly communicate, for example, via a Wi-Fi channel or other available network connection interface 912 to the external/remote display 950.

In an example implementation, the network connection interface 912 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC)

port, another like communication interface, or any combination thereof. In one example, the display interface 904 may be operatively coupled to a local display, such as a touch-screen display associated with a mobile device. In another example, the display interface 904 may be configured to provide video, graphics, images, text, other information, or any combination thereof for an external/remote display 950 that is not necessarily connected to the mobile computing device. In one example, a desktop monitor may be used for mirroring or extending graphical information that may be presented on a mobile device. In another example, the display interface 904 may wirelessly communicate, for example, via the network connection interface 912 such as a Wi-Fi transceiver to the external/remote display 950.

The computing device architecture 900 may include a keyboard interface 906 that provides a communication interface to a keyboard. In one example implementation, the computing device architecture 900 may include a presence-sensitive display interface 908 for connecting to a presence-sensitive display 907. According to certain example implementations of the disclosed technology, the presence-sensitive display interface 908 may provide a communication interface to various devices such as a pointing device, a touch screen, a depth camera, etc. which may or may not be associated with a display.

The computing device architecture 900 may be configured to use an input device via one or more of input/output interfaces (for example, the keyboard interface 906, the display interface 904, the presence sensitive display interface 908, network connection interface 912, camera interface 914, sound interface 916, etc.) to allow a user to capture information into the computing device architecture 900. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 900 or may be a separate device. For example, the input device may be an accelerometer, a magnetometer, a digital camera, a microphone, and an optical sensor.

Example implementations of the computing device architecture 900 may include an antenna interface 910 that provides a communication interface to an antenna; a network connection interface 912 that provides a communication interface to a network. As mentioned above, the display interface 904 may be in communication with the network connection interface 912, for example, to provide information for display on a remote display that is not directly connected or attached to the system. In certain implementations, a camera interface 914 is provided that acts as a communication interface and provides functions for capturing digital images from a camera. In certain implementations, a sound interface 916 is provided as a communication interface for converting sound into electrical signals using a microphone and for converting electrical signals into sound using a speaker. According to example implementations, a random-access memory (RAM) 918 is provided, where computer instructions and data may be stored in a volatile memory device for processing by the CPU 902.

According to an example implementation, the computing device architecture 900 includes a read-only memory (ROM) 920 where invariant low-level system code or data for basic system functions such as basic input and output (I/O), startup, or reception of keystrokes from a keyboard are stored in a non-volatile memory device. According to an example implementation, the computing device architecture 900 includes a storage medium 922 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 924, application programs 926 (including, for example, a web browser application, a widget or gadget engine, and or other applications, as necessary) and data files 928 are stored. According to an example implementation, the computing device architecture 900 includes a power source 930 that provides an appropriate alternating current (AC) or direct current (DC) to power components.

According to an example implementation, the computing device architecture 900 includes a telephony subsystem 932 that allows the device 900 to transmit and receive sound over a telephone network. The constituent devices and the CPU 902 communicate with each other over a bus 934.

According to an example implementation, the CPU 902 has appropriate structure to be a computer processor. In one arrangement, the CPU 902 may include more than one processing unit. The RAM 918 interfaces with the computer bus 934 to provide quick RAM storage to the CPU 902 during the execution of software programs such as the operating system application programs, and device drivers. More specifically, the CPU 902 loads computer-executable process steps from the storage medium 922 or other media into a field of the RAM 918 to execute software programs. Data may be stored in the RAM 918, where the data may be accessed by the computer CPU 902 during execution.

The storage medium 922 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 922, which may include a machine-readable storage medium.

According to one example implementation, the term computing device, as used herein, may be a CPU, or conceptualized as a CPU (for example, the CPU 902 of FIG. 9). In this example implementation, the computing device (CPU) may be coupled, connected, and/or in communication with one or more peripheral devices, such as display. In another example implementation, the term computing device, as used herein, may refer to a mobile computing device such as a Smartphone, tablet computer, or smart watch. In this example implementation, the computing device may output content to its local display and/or speaker(s). In another example implementation, the computing device may output content to an external display device (e.g., over Wi-Fi) such as a TV or an external computing system.

Certain embodiments of the disclosed technology are described above with reference to block and flow diagrams of systems and methods and/or computer program products according to example embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Embodiments of the disclosed technology may provide for a computer program product, including a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

An embodiment of the present disclosure may be implemented according to at least the following:

Clause 1: A quantum computing method comprising: receiving program instructions; executing the program instructions on a quantum machine for a plurality of trials to generate a plurality of results; combining the plurality of results of the execution for each of the plurality of trials; and determining a program result of the execution based on the combination of the plurality of results.

Clause 2: The method of clause 1 further comprising: identifying a plurality of quantum configurations of the quantum machine for executing the program; executing respective subsets of the plurality of trials on each of the plurality of identified quantum configurations; and merging results of the plurality of trials to determine the program result of the execution.

Clause 3: The method of clause 2 further comprising distributing the trials between the respective subsets evenly.

Clause 4: The method of clause 2 further comprising distributing the trials between the respective subsets unevenly based on expected configuration reliability.

Clause 5: The method of clause 2 or clause 4 further comprising distributing the trials between the respective subsets unevenly based on at least one from among non-uniformity, entropy of distribution, and fitness of solution of partial trial sets executed on the identified quantum configurations.

Clause 6: The method of any of clauses 1-6 further comprising weighting the results of the plurality of trials based on at least one from among expected configuration reliability, non-uniformity, entropy of distribution, and fitness of solution, the determining being based on the merged weighted results.

Clause 7: The method of any of clauses 1-6 further comprising: translating the program instructions into a plurality of operation sets, each of the plurality of operation sets being able to fully execute the program instructions; executing respective subsets of the plurality of trials in accordance with each of the plurality of operation sets; and merging results of the plurality of trials to determine the program result of the execution.

Clause 8: The method of clause 7 further comprising distributing the trials between the respective subsets evenly.

Clause 9: The method of clause 7 further comprising distributing the trials between the respective subsets unevenly based on expected operation set reliability.

Clause 10: The method of clause 7 or clause 9 further comprising distributing the trials between the respective subsets unevenly based on at least one from among non-uniformity, entropy of distribution, and fitness of solution of partial trial sets executed in accordance with the respective operation sets.

Clause 11: The method of any of clauses 7-10 further comprising weighting the results of the plurality of trials based on at least one from among expected operation set reliability, non-uniformity, entropy of distribution, and fitness of solution, the determining being based on the merged weighted results.

Clause 12: The method of any of clauses 7-11 further comprising algorithmically diversifying the program instructions, the algorithmically diversified program instructions being translated into the plurality of operation sets Clause 13: The method of clauses 1-12 further comprising: transforming a state of a subset of the plurality of results creating a plurality of transformed results and a plurality of untransformed results; measuring the plurality of transformed results creating a plurality of transformed measurements; rectifying the plurality of transformed measurements to compensate for the transforming creating a plurality of rectified measurements; measuring the plurality of untransformed results creating a plurality of untransformed measurements; combining the rectified measurements and the untransformed measurements; and determining the program result of the execution based on the combination of measurements.

Clause 14: The method of clause 13 further comprising distributing the results between the respective subsets evenly.

Clause 15: The method of clause 13 further comprising distributing the trials between the respective subsets unevenly based on expected state reliability.

Clause 16: The method of clause 13 or clause 15 further comprising distributing the trials between the respective subsets unevenly based on at least one from among non-uniformity, entropy of distribution, and fitness of solution of partial measurements in different states.

Clause 17: The method of any of clauses 13-16 further comprising weighting the measurements of the plurality of trials based on at least one from among expected state reliability, non-uniformity, entropy of distribution, and fitness of solution, the determining being based on the merged weighted measurements.

Clause 18: The method of any of clauses 13, wherein the transforming comprises inverting one or more qubits of the results in the subsets.

Clause 19: The method of any of clauses 1-18 further comprising: distributing the plurality of results into a plurality of subsets; respectively transforming a state of the results for each subset of the plurality of results creating respective pluralities of transformed results; measuring the respective pluralities of transformed results creating a respective plurality of transformed measurements; rectifying the respective pluralities of transformed measurements to compensate for the transforming creating respective pluralities of rectified measurements; combining the respective pluralities of rectified measurements; and determining the program result of the execution based on the combination of the pluralities of rectified measurements.

Clause 20: The method of any of clauses 1-19 further comprising identifying a plurality of quantum machines for executing the program; executing respective subsets of the plurality of trials on each of the plurality of identified quantum machines; and merging results of the plurality of trials to determine the program result of the execution.

Clause 21: A quantum computing method comprising: receiving program instructions; executing the program instructions on a quantum machine for a plurality of diverse trials to generate a plurality of results; combining the plurality of results of the execution for each of the plurality of diverse trials; and determining a program result of the execution based on the combination of the plurality of results.

Clause 22: A quantum computing method comprising: receiving program instructions; executing the program instructions on a plurality of quantum machine for a plurality of trials to generate a plurality of results; combining the plurality of results of the execution for each of the plurality of trials; and determining a program result of the execution based on the combination of the plurality of results.

Clause 23: A quantum machine comprising: a quantum core; and a central controller configured to execute any of the methods of any one of clauses 1-22.

Clause 24: A quantum machine comprising: quantum bits; and a quantum control processor configured to implement the method of any one of claims 1-22.

Clause 25: A non-transitory computer readable medium having stored thereon instructions for a quantum machine to execute any of the methods of any one of clauses 1-22.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person of ordinary skill to practice certain embodiments of the disclosed technology, including making and using any devices or systems and performing any incorporated methods. The patentable scope of certain embodiments of the disclosed technology is defined in the claims, and may include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. A quantum computing method comprising:

executing program instructions on a quantum machine for one or more trials generating one or more results;

combining the generated results; and determining a program result of the execution based on the combination of the generated results by:

identifying one or more quantum configurations of the quantum machine for executing the program instructions;

executing respective subsets of the trials on the identified quantum configurations, a respective subset of the trials generating subset results; and merging the subset results.

2. The method of claim 1 further comprising:

receiving the program instructions;

wherein determining the program result further comprises:

distributing the trials between the respective subsets, the distributing selected from the group consisting of:

distributing the trials between the respective subsets evenly;

distributing the trials between the respective subsets unevenly based on expected configuration reliability; and distributing the trials between the respective subsets unevenly based on at least one from among non-uniformity, entropy of distribution, and fitness of solution of partial trial sets executed on the identified quantum configurations.

3. The method of claim 1 further comprising:

receiving the program instructions;

wherein determining the program result further comprises:

weighting the subset results based on at least one of expected configuration reliability, non-uniformity, entropy of distribution, or fitness of solution.

4. A quantum computing method comprising:

executing program instructions on a quantum machine for one or more trials generating one or more results;

combining the generated results; and determining a program result of the execution based on the combination of the generated results by:
translating the program instructions into one or more operation sets;
executing respective subsets of the trials in accordance with the operation sets, a respective subset of the trials generating subset results; and
merging the subset results.

5. The method of claim 4, wherein determining the program result further comprises:
distributing the trials between the respective subsets, the distributing selected from the group consisting of:
distributing the trials between the respective subsets evenly;
distributing the trials between the respective subsets unevenly based on expected operation set reliability; and
distributing the trials between the respective subsets unevenly based on at least one from among non-uniformity, entropy of distribution, and fitness of solution of partial trial sets executed in accordance with the respective operation sets.

6. The method of claim 4, wherein determining the program result further comprises:
weighting the subset results based on at least one of expected operation set reliability, non-uniformity, entropy of distribution, or fitness of solution.

7. The method of claim 4 further comprising:
algorithmically diversifying the program instructions;
wherein the algorithmically diversified program instructions are translated into the operation sets.

8. A quantum computing method comprising:
executing program instructions on a quantum machine for one or more trials generating one or more results;
combining the generated results; and
determining a program result of the execution based on the combination of the generated results by:
transforming a state of a subset of the generated results, creating a transformed subset of results;
measuring the transformed subset of results, creating one or more transformed measurements;
rectifying the transformed measurements to compensate for the transforming, creating one or more rectified measurements;
measuring an untransformed subset of results, creating one or more untransformed measurements; and
combining the rectified measurements and the untransformed measurements.

9. The method of claim 8, wherein determining the program result further comprises:
distributing the trials between the respective subsets, the distributing selected from the group consisting of:
distributing the trials between the respective subsets evenly;
distributing the trials between the respective subsets unevenly based on expected state reliability; and
distributing the trials between the respective subsets unevenly based on at least one of non-uniformity, entropy of distribution, or fitness of solution of partial measurements in different states.

10. The method of claim 8, wherein determining the program result further comprises:
weighting the measurements based on at least one of expected state reliability, non-uniformity, entropy of distribution, or fitness of solution.

11. The method of claim 8, wherein transforming the state of the subset of the generated results comprises inverting one or more qubits of the transformed subset of results.

12. A quantum computing method comprising:
executing program instructions on a quantum machine for one or more trials generating one or more results;
combining the generated results; and
determining a program result of the execution based on the combination of the generated results by:
distributing the generated results into one or more subsets;
respectively transforming a state of the generated results, creating respective transformed subset of the results;
measuring the respective subset of transformed results, creating a respective one or more transformed measurements;
rectifying the respective transformed measurements to compensate for the transforming, creating respective one or more rectified measurements; and
combining the respective rectified measurements.

13. A quantum machine comprising:
quantum bits; and
a quantum control processor configured to implement the method of claim 1.

14. A quantum machine comprising:
a quantum core; and
a central controller configured to execute the method of claim 1.

15. A quantum machine comprising:
quantum bits; and
a quantum control processor configured to implement the method of claim 4.

16. A quantum computing method comprising:
executing program instructions on a quantum machine for a plurality of trials to generate a plurality of results;
combining the plurality of results of the execution for each of the plurality of trials; and
determining a program result of the execution based on the combination of the plurality of results, the determining comprising:
identifying a plurality of quantum configurations of the quantum machine for executing the program, executing respective subsets of the plurality of trials on each of the plurality of identified quantum configurations, and merging results of the plurality of trials;
translating the program instructions into a plurality of operation sets, each of the plurality of operation sets being able to fully execute the program instructions, executing respective subsets of the plurality of trials in accordance with each of the plurality of operation sets, and merging results of the plurality of trials;
transforming a state of a subset of the plurality of results creating a plurality of transformed results and a plurality of untransformed results, measuring the plurality of transformed results creating a plurality of transformed measurements, rectifying the plurality of transformed measurements to compensate for the transforming creating a plurality of rectified measurements, measuring the plurality of untransformed results creating a plurality of untransformed measurements, and combining the rectified measurements and the untransformed measurements; or
distributing the plurality of results into a plurality of subsets, respectively transforming a state of the results for each subset of the plurality of results creating respective pluralities of transformed results, measuring the respective pluralities of transformed results creating a respective plurality of transformed measurements, rectifying the respective pluralities of transformed measurements to compensate for the transforming creating respective pluralities of rectified measurements, and combining the respective pluralities of rectified measurements.

17. A non-transitory computer readable medium having stored thereon instructions for a quantum machine to execute the method of claim 16.

18. A quantum machine comprising:
a quantum core; and
a central controller configured to execute the method of claim 4.

19. A quantum machine comprising:
quantum bits; and
a quantum control processor configured to implement the method of claim 8.

20. A quantum machine comprising:
a quantum core; and
a central controller configured to execute the method of claim 8.

21. A quantum machine comprising:
quantum bits; and
a quantum control processor configured to implement the method of claim 12.

22. A quantum machine comprising:
a quantum core; and
a central controller configured to execute the method of claim 12.

* * * * *